United States Patent

Kitazawa

[15] 3,690,587

[45] Sept. 12, 1972

[54] AUTOMATIC TAPE CASSETTE RECORDING AND PLAYBACK APPARATUS

[72] Inventor: Ryozo Kitazawa, Kawasaki, Japan

[73] Assignee: Nippon Columbia Kabushikikaisha (Nippon Columbia Co., Ltd.), Tokyo

[22] Filed: Feb. 25, 1970

[21] Appl. No.: 13,978

[30] Foreign Application Priority Data

| | | |
|---|---|---|
| June 6, 1969 | Japan | 44/44492 |
| June 6, 1969 | Japan | 44/53070 |
| Dec. 29, 1969 | Japan | 45/135 |
| Jan. 10, 1970 | Japan | 45/3119 |

[52] U.S. Cl. ....................242/181, 242/197, 274/4 G

[51] Int. Cl. ............................................G11b 23/02

[58] Field of Search......242/180, 181, 194, 197, 199, 242/200; 179/100.2 Z; 274/4 F, 4 G; 352/123

[56] References Cited

UNITED STATES PATENTS

| | | | |
|---|---|---|---|
| 3,244,378 | 4/1966 | Rost | 242/181 |
| 3,453,397 | 7/1969 | Miller et al. | 274/4 |
| 3,484,055 | 12/1969 | Raine | 242/181 |

*Primary Examiner*—Stanley N. Gilreath
*Assistant Examiner*—Werner H. Schroeder
*Attorney*—Hill, Sherman, Meroni, Gross & Simpson

[57] ABSTRACT

An automatic tape cassette recording and playback apparatus having cassette support means for a plurality of tape cassettes, means for slidably supporting the cassette support means and having guide hole means, tape recording and playback means, means for driving the cassette support means, means for driving one of the plurality of tape cassettes, a mechanism for interlocking the tape recording and playback means, the means for driving the cassette support means, a motor for driving the interlocking mechanism and the tape driving means, means for selectively driving the interlocking mechanism, tape detecting means, and electric circuit means for controlling the motor and the interlocking mechanism driving means.

15 Claims, 37 Drawing Figures

INVENTOR.
Ryozo Kitazawa

BY Hill, Sherman, Meroni, Gross & Simpson ATTORNEYS

INVENTOR.
Ryozo Kitazawa

BY Hill, Sherman, Meroni, Gross & Simpson ATTORNEYS

PATENTED SEP 12 1972 3,690,587

SHEET 03 OF 12

INVENTOR.
Ryozo Kitazawa

BY Hill, Sherman, Meroni, Gross & Simpson ATTORNEYS

INVENTOR.
Ryozo Kitazawa

BY Hill, Sherman, Meroni, Gross & Simpson ATTORNEYS

INVENTOR.
Ryozo Kitazawa
BY Hill, Sherman, Meroni, Gross & Simpson ATTORNEYS

INVENTOR
Ryozo Kitazawa

BY Hill, Sherman, Meroni, Gross & Simpson ATTORNEYS

INVENTOR.
Ryozo Kitazawa

BY Hill, Sherman, Meroni, Gross & Simpson ATTORNEYS

INVENTOR.
Ryozo Kitazawa
BY Hill, Sherman, Meroni, Gross & Simpson ATTORNEYS

INVENTOR.
Ryozo Kitazawa

BY Hill, Sherman, Meroni, Gross & Simpson ATTORNEYS

INVENTOR.
Ryozo Kitazawa

BY Hill, Sherman, Meroni, Gross & Simpson ATTORNEYS

INVENTOR
Ryozo Kitazawa

BY Hill, Sherman, Meroni, Gross & Simpson ATTORNEYS

INVENTOR.
Ryozo Kitazawa

BY Hill, Sherman, Meroni, Gross & Simpson ATTORNEYS

AUTOMATIC TAPE CASSETTE RECORDING AND PLAYBACK APPARATUS

BACKGROUND OF THE INVENTION

1. Field of the Invention

This invention relates to an automatic tape cassette recording and playback apparatus, and more particularly to an automatic tape cassette recording and playback apparatus which is adapted for automatic recording and playing back of a plurality of tape cassettes in a preselected sequential order.

2. Description of the Prior Art

There has been proposed in the prior art a device which automatically records and plays back a plurality of tape cassettes.

SUMMARY OF THE INVENTION

A primary object of this invention is to provide an automatic tape cassette recording and playback apparatus capable of automatically playing a plurality of tape cassettes in a sequential order in which a tape cassette support frame is slidably mounted on a top deck plate; a plurality of tape cassettes are arranged in the support frame with their magnetic head contact surfaces facing downward; a selected one of the tape cassettes is brought down through a guide hole bored in the top deck plate to its playback position for playing back the tape enclosed in the cassette; upon detection of completion of the playing back of the tape cassette is brought through the guide hole back to its initial position in the tape cassette support frame; and the above operations are repeatedly carried out.

Another object of this invention is to provide an automatic tape cassette recording and playback apparatus which is small in size, capable of continuous playing for hours and reliable in operation.

Another object of this invention is to provide an automatic tape cassette recording and playback apparatus in which no tape drive members such as a capstan, a magnetic head and so on are provided above tape cassettes which are movably arranged side by side or radially on a top deck plate of the apparatus.

Another object of this invention is to provide an automatic tape cassette recording and playback apparatus which allows case in loading and unloading of tape cassettes on and from a tape cassette support frame, especially in rearrangement of tape cassettes or replacement of them with new ones while playing back a selected one.

Another object of this invention is to provide an automatic tape cassette recording and playback apparatus which is adapted so that a tape cassette being played back can be seen from outside and care is taken to prevent adherence of dust or the like to tapes of tape cassettes arranged in a tape cassette support frame.

Another object of this invention is to provide an automatic tape cassette recording and playback apparatus which is designed so that indications of recorded contents of tapes housed in tape cassettes can be readily seen at all times.

Another object of this invention is to provide an automatic tape cassette recording and playback apparatus which is provided with cassette support means for facilitating movement of tape cassette across a guide hole bored in a top deck plate of the apparatus.

Still another object of this invention is to provide an automatic tape cassette recording and playback apparatus which is provided with cassette support means by which a tape cassette placed on a guide hole in a top deck plate of the player is slowly brought down to its playback position and, after played back, slowly brought up back to its initial position.

Other objects, features and advantages of this invention will become apparent from the following description taken in conjunction with the accompanying drawings.

DESCRIPTION OF THE PREFERRED EMBODIMENTS

Figure 3:
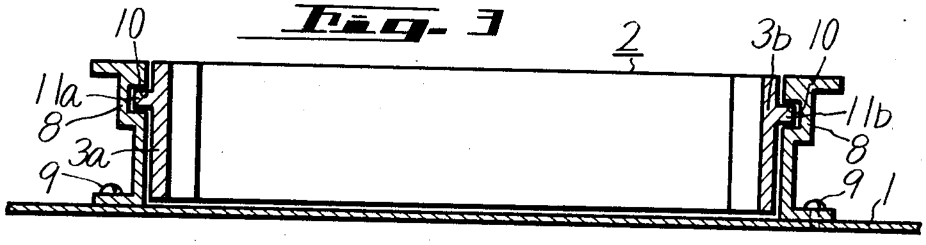
FIG. 3 is a cross-sectional view showing the relationship between the tape cassette support frame and guide walls of the apparatus illustrated in FIG. 1A.
Figure 4:
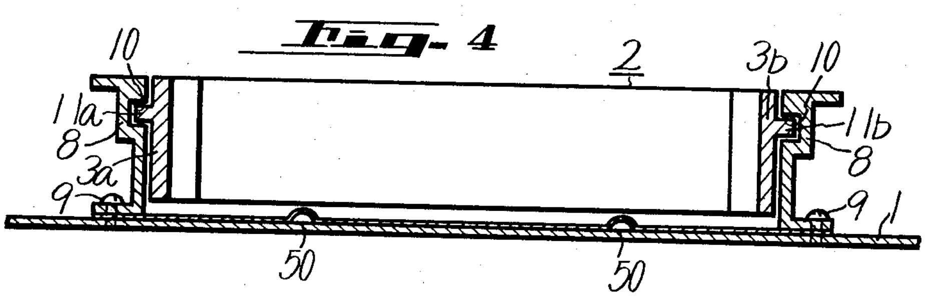
FIG. 4 is a cross-sectional view, similar to FIG. 3, showing the relationship between the tape cassette support frame and the guide walls in accordance with a modified form of this invention.

In the drawings reference numeral 1 indicates a top deck plate of one example of an automatic tape cassette recording and playback apparatus produced according to this invention. On the top deck plate 1 there is mounted a cassette support frame 2 in a manner to be freely slidable on the plate 1. The cassette support frame 2 is of a substantially rectangular configuration consisting of a pair of opposed longer side walls 3*a* and 3*b* and a pair of opposed shorter side walls 4*a* and 4*b*. On the opposing inner surfaces of the longer side walls 3*a* and 3*b* of the cassette support frame 2 there are formed integral therewith a plurality of opposed cassette holding pieces 7*a* and 7*b* projecting inwardly thereof at regular intervals *d'* a little greater than the thickness *d* of the tape cassette 5 (refer to FIG. 5) and thus the cassette holding pieces 7*a* and 7*b* loosely hold therebetween the tape cassette 5 at its both side end portions 6,6. Reference numerals 8,8 designate a pair of guide walls or rails for guiding the cassette support frame 2 in its longitudinal direction, the guide walls 8 being respectively fixed by means of, for example, screws 9 on the top deck plate 1 in parallel with each other as depicted in FIGS. 3 and 4. Each guide wall 8 has formed therein on the inside thereof a groove 10 extending substantially entire length thereof, while the longer side walls 3*a* and 3*b* of the cassette support frame 2 have elongated projections 11*a* and 11*b* formed on the outside thereof, that is, on the opposite sides from the cassette holding pieces 7*a* and 7*b*, which projections are fitted into the grooves 10 to permit sliding movement of the cassette support frame 2 on the top deck plate 1. Reference numeral 12 identifies a substantially rectangular guide hole which is bored through the top deck plate 1 substantially in parallel with the shorter side walls 4*a* and 4*b* and is of a size a little larger than a magnetic head contact face 13' of the tape cassette 5, that is, permitting the passage therethrough of the tape cassette 5. A selected one of a plurality of cassettes arranged side by side in the cassette support frame 2 is slowly brought through the guide hole 12 down to its playback position and after played back the cassette is slowly brought up back to its initial position in the cassette support frame 2. Such slow upward and downward movement of the selected tape cassette 5 through the guide hole 12 is achieved by a cassette support of drive member 13 provided under the top deck plate 1.

Figure 1A:
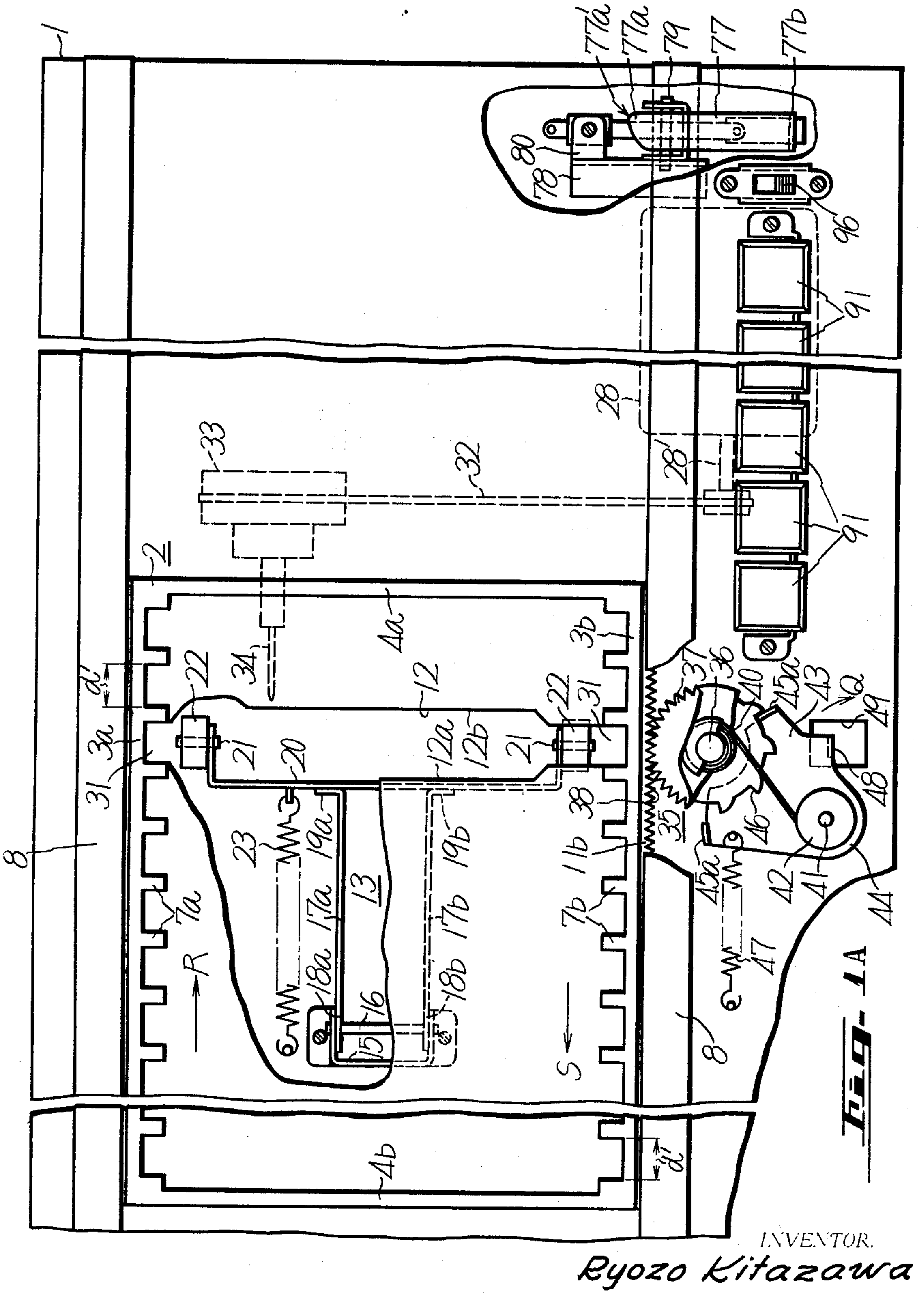
FIG. 1A is a top plan view, partly cut away, of an automatic tape cassette recording and playback apparatus of this invention.
Figure 1B:
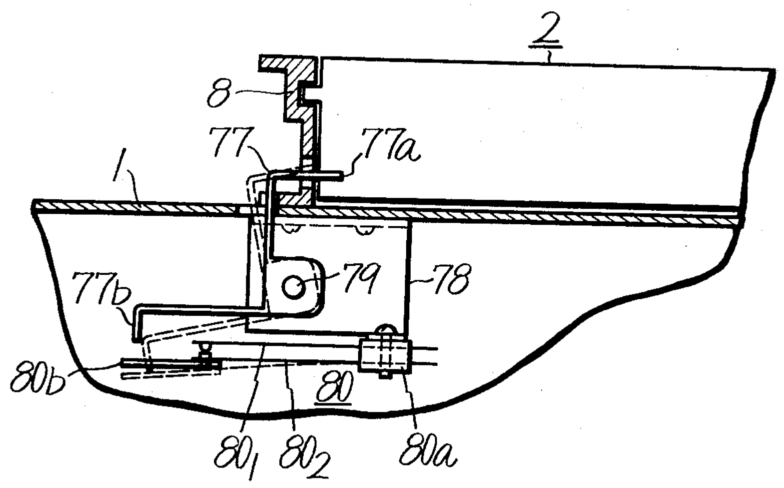
FIG. 1B is a fragmentary side view, partly cut away, of the apparatus shown in FIG. 1A.
Figure 1C:
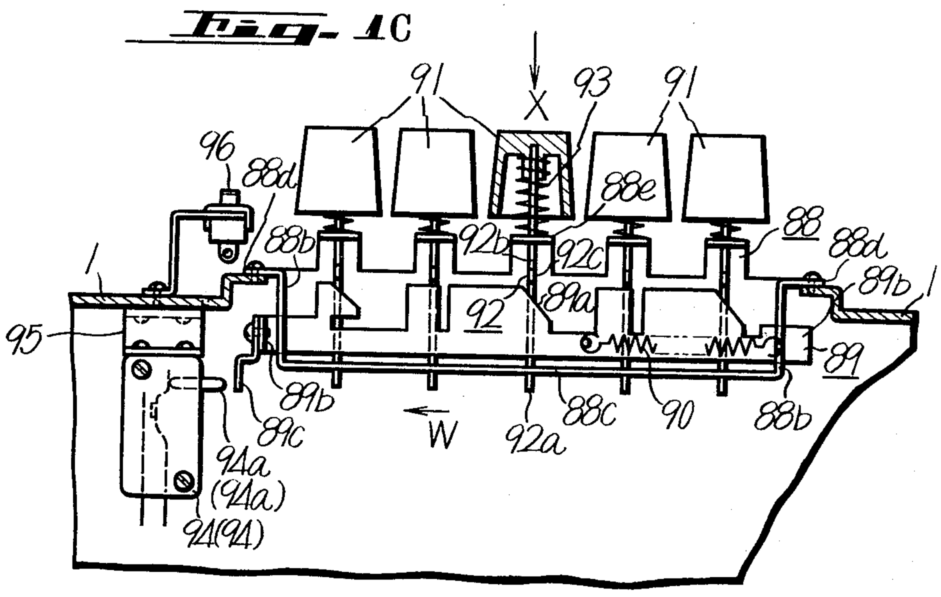
FIG. 1C is an enlarged side view, partly in cross section, of an operating switch portion of the apparatus depicted in FIG. 1A.
Figure 2:
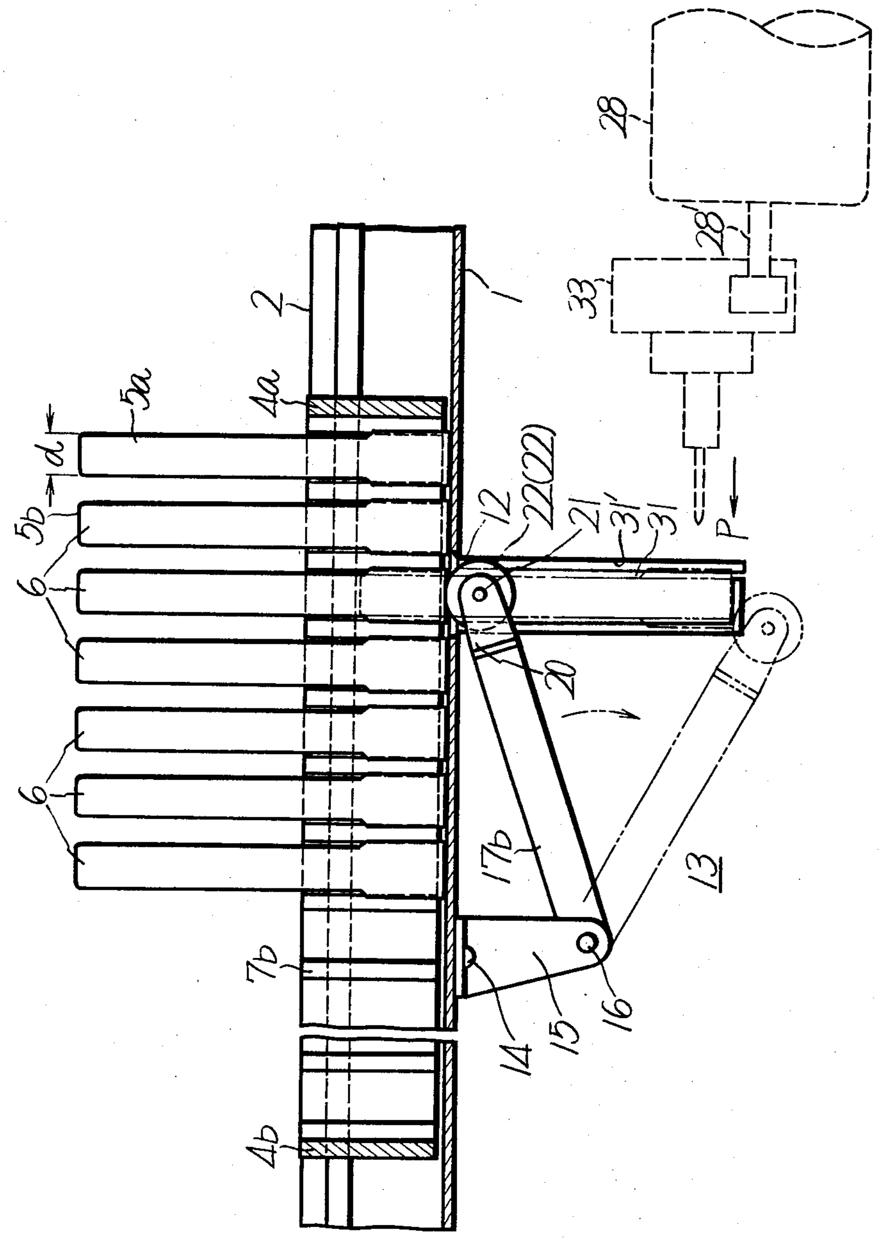
FIG. 2 is a side view, partly in cross section, of a tape cassette support frame shown in FIG. 1A in which tape cassettes are mounted.
Figure 5:
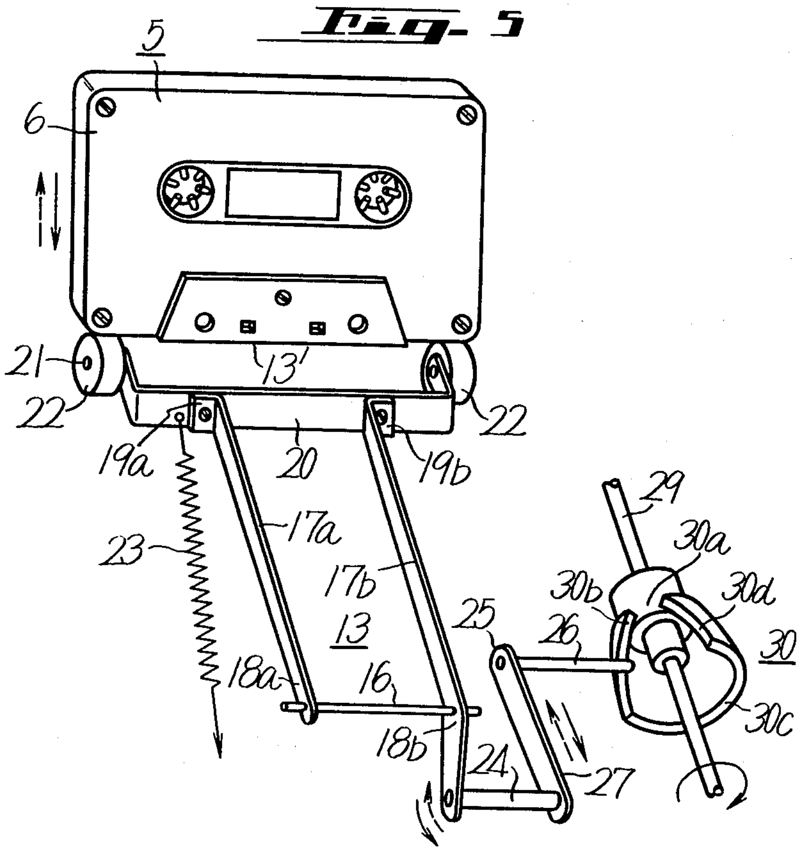
FIG. 5 is a schematic perspective view of tape cassette support means depicted in FIG. 1A.

Referring now to FIGS. 1, 2 and 5, one example of the cassette support or drive member 13 will hereinbelow be described. An angled bracket 15 is fixed by means of, for example, bolts 14,14 to the back or the underside of the top deck plate 1 and a shaft 16 is mounted at both ends on the bracket 15 substantially in parallel with the top deck plate 1 and perpendicular to a direction of movement of the cassette support frame 2. Arms 17*a* and 17*b* are hinged at one end about the shaft 16 at its both ends as indicated by 18*a* and 18*b* and are fixed at the other ends 19*a* and 19*b* to a shallow U-shaped support 20, on both ends of which are rotatably mounted rollers 22,22 by means of pins 21,21 extending in the same direction as the shaft 16. A spring 23 is stretched between the support 20 and the underside of the deck plate 1, by means of which the support 20 and consequently the rollers 22 are pulled up to slightly project out from the guide hole 12. However, where the rollers 22 lie near opposing edges 12*a* and 12*b* of the top deck plate across the guide hole 12 and these opposing edges 12*a* and 12*b* are gently inclined so as to facilitate the passage of the tape cassette on the guide hole 12, the rollers 22 need not always project out from the guide hole 12. Under such conditions, the cassette 5 lying just on the guide hole 12 is supported by the rollers 22 and hence does not drop in the guide hole 12 unnecessarily.

The spring 23 is stretched in a manner to pull up the cassette support 13 at all times, so that even if the cassette 5 or the support 13 is accidentally forced down into the guide hole 12 by hand against the force of the spring 23, the device will not be broken.

When the device is in its inoperative condition, the rollers 22 lie in the guide hole 12 as above described and are substantially flush with the top deck plate 1, that is, form smooth planes therewith. Accordingly, the rollers 22 does not hinder the sliding movement of the cassettes 5 on the top deck plate 1 across the guide hole 12 but rather facilitates the smooth sliding movement of the cassettes 5.

It is also possible to provide on the support 20 fixed members having smooth surfaces instead of the rollers 22.

While, one end, for example, 18b of the arm 17b is bent down and a shaft 24 is mounted on the bent end portion thereof to extend in the same direction as the shaft 16 and the free end of the shaft 24 is journalled to on end of a lever 27 having a pin 26 planted on the other end 25, as illustrated in FIG. 5. The pin 26 is engaged at one end with a cam 30 fixedly mounted on a main shaft 29 driven by a motor 28 through a gear mechanism or the like described later. As depicted in FIG. 5, the cam 30 has a cam face 30*a* for picking up a preselected cassette, another cam face 30*b* for bringing down the selected cassette, another cam face 30*c* for playing back the tape loaded in the selected cassette, another cam face 30*d* for bringing up the cassette and other cam faces 30*e* and 30*f*, which will be explained later.

In the foregoing the cassette support 13 having the rollers 22 are moved up and down in association with the cam 30 but it will be seen that the support 13 may be moved in parallel with the top deck plate 1 by other suitable means.

To facilitate the upward and downward movement of the cassette inserted into the guide hole 12, the top deck plate 1 has formed therein guide portions 31,31 having guide grooves 31',31' which are located on the underside of the top deck plate 1 on both sides of the guide hole 12 and along which the cassette is guided up and down.

Figure 6:
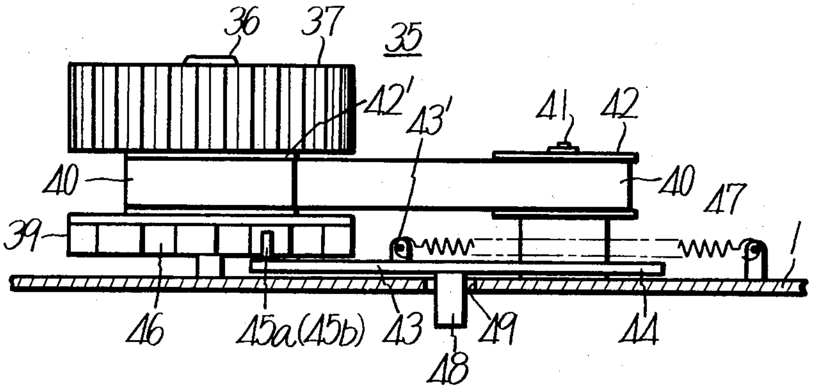
FIG. 6 is an enlarged side view of cassette support frame drive means shown in FIG. 1A.

In FIGS. 1 and 6 reference numeral 35 indicates generally means for driving the cassette support frame mounted on the top deck plate 1. As is apparent from the figures, a gear 37 is rotatably mounted on the top of a pin 36 planted on the top deck plate 1 on an extension of the guide hole 12 in its lengthwise direction and in the vicinity of the outside of one guide wall 8. One portion of the guide wall 8 adjoining the gear 37 is removed to form therein a window, through which the gear 37 meshes with a rack 38 formed on the outside of the projection, for example, 11b projecting from one longer side wall 3b of the cassette support frame 2. A ratchet wheel 39 is mounted on the lower end portion of the shaft 36 in a manner to be rotatable with the gear 37. On a hub 42' mounted on the shaft 36 between the gear 37 and the ratchet wheel 39 there is wound a coiled spring 40 fixed at one end to the hub 42' and wound at the other end on a drum 42 in a manner to be always coiled round it due to the distorsional stress of the spring itself, which drum 42 is rotatably mounted on a shaft 41 planted on the top deck plate 1 at a place spaced apart from the shaft 36. A sectoral rotary plate 43 is pivoted at its base 44 to the shaft 41 under the drum 42 and is adapted to be rotatable about the shaft 41 on the top deck plate 1. A pair of lugs **45*a* and 45*b* formed on the rotary plate 43 at its front end corners are designed to be alternately engaged with teeth 46 of the ratchet wheel 39. However, the drum 42 and the rotary plate 43** need not always be mounted on the same shaft.

Reference numeral 47 designates a spring which is stretched between the top deck plate 1 and a lug 43' of the rotary plate 43 to pull the rotary plate 43 anticlockwise about the shaft 41 at all times. The rack 38 and the gear 37 are meshed with each other in such a manner that when the rotary plate 43 is retained in its biased position by the spring 47, the cassette holding pieces **7*a* and 7*b* of the cassette support frame 2 agree in position with the guide hole 12 bored in the top deck plate 1 so as to permit the passage of the cassette through the guide hole 12. Reference numeral 48 indicates a bent portion downwardly extending from one marginal portion of the rotary plate 43 or a pin planted thereon, which extends down through an aperture 49 bored in the top deck plate 1. The bent portion or pin 48 is moved in a direction indicated by the arrow Q in FIG. 1 for a little while by the cam face 30e (indicated by the broken line in FIG. 7) of the cam 30 affixed to the main shaft 29 as will be described later, by which the rotary plate 43 is turned clockwise about the shaft 41 against the force of the spring 47 and the gear 37 is turned by the force of the coiled spring 40, thus sliding the cassette support frame 2 on the top deck plate 1 step by step in a direction of the arrow R in FIG. 1. In the present example the cassette support frame drive means 35 is automatically actuated by the cam face 30e of the cam 30 but this operation can be easily achieved from the outside by means of a manual button. Such an arrangement as above described ensures to feed the cassette support frame 2 by one pitch of the cassette holding pieces 7*a* and 7*b* and the provision of the cassette support frame drive means in the vicinity of the guide hold enables very precise control of the position of the cassette. When moving the cassette support frame 2 in a direction reverse to the frame driving direction, the frame 2 can be smoothly moved to a desired position by pushing the frame manually or by suitable means in a direction of the arrow S in FIG. 1 without being stopped by the cassette drive means 35**.

Referring now to FIGS. 1A and 1B, a description will be given of the construction of a final play position detecting device for detecting that the cassette support frame 2 has been brought in the direction of the arrow R to its extreme position. In the figures reference numeral 77 indicates a drive arm whose one end **77*a* projects through an aperture bored in, for example, one guide rail 8 near its end in a manner to engage the cassette support frame 2. The drive arm 77 is rotatably mounted on a pin 79 planted on a bracket 78 which is fixed to the top deck plate 1 and extends down from the top deck plate 1 substantially perpendicular thereto. The other end 77*b* of the drive arm 77 engages an insulating material piece 80b fixed to the free end of a contact piece $80_2$ of a normally closed switch 80 which consists of contact pieces $80_1$ and $80_2$ fixed at their bases to an insulating support 80a which is, in turn, secured to the bracket 78. The end face of the projecting end 77*a* of the drive arm 77 has a smooth and gently inclined face 77*a'* so that when the cassette support frame 2 engages the face 77*a'*, the projecting end is gradually pushed back by the frame 2 which is moved in the direction of the arrow R. When the cassette support frame 2 has been brought to its extreme position, the drive arm 77 is turned as indicated by the broken lines in FIG. 1B and its end 77*b* pushes the insulating material piece 80*b* to disconnect the contacts $80_1$ and $80_2$ of the normally closed switch 80** from each other.

Turning to FIGS. 1A and 1C, a description will be made in connection with one example of an operating switch mechanism. Reference numeral 88 indicates a frame, which is secured at both ends **88*d*, 88*d* to the top deck plate 1 as indicated. Grooves or slits are formed in both side vertical portions 88*b*, 88*b* of the frame 88 at corresponding locations and sliding portions 89*b*, 89*b* of a sliding member 89 are inserted into the slits to support the sliding member 89 in a manner to permit it to slide in a direction of the arrow W in FIG. 1C. While, each actuator 92 is supported by guide members 88*c* and 88*e* of the frame 88 in such a manner as to be slidable in a direction substantially perpendicular to the direction of the arrow W (direction X in FIG. 1C). A push button 91 is affixed to the top end of the actuator 92, in which case a spring 93 is inserted between the push button 91 and the upper guide portion 88e to always bias the actuator in an upward direction reverse to the direction of the arrow X. When pushed in the direction of the arrow X, and engaging member 92C of the actuator 92 pushes the sliding member 89 in the direction of the arrow W while engaging a slide face 89*a* of the sliding member 89 which is always biased in the direction reverse to that of the arrow W by a spring 90 stretched between the guide portion 88*b* and the sliding member 89. In such a case a switch drive portion 89*c* provided on one end of the sliding member 89 actuates operating members 94*a*, 94*a* of two normally open switches 94,94 to close them. Releasing the push button 91, the sliding member 89 and the actuator 92 are respectively returned to their initial conditions by the springs 90 and 93, so that the switch drive portion 89*c* moves away from the operating members 94*a*, 94*a* to return the normally open switches 94 to their open conditions. Reference numeral 96** indicates a changeover switch for automatic continuous playing operation of the present apparatus and stopping the operation after completion of playback of the selected cassette.

Generally, the top deck plate 1 and the head contact face 13' of the tape cassette are both substantially flat and always make contact with each other, so that, after long use, the sliding movement of the cassette support frame 2 results in wear of the surface of the top deck plate 1 to obstruct smooth sliding movement of the tape cassette and damage its head contact face 13'. To avoid this, rail-like guides 50,50 are formed on the top deck plate 1 integrally therewith or separately at suitable positions where the head contact face 13' of the tape cassette makes contact with the top deck plate 1 on these guides to minimize the contact areas, as illustrated in FIG. 4.

Figure 7:
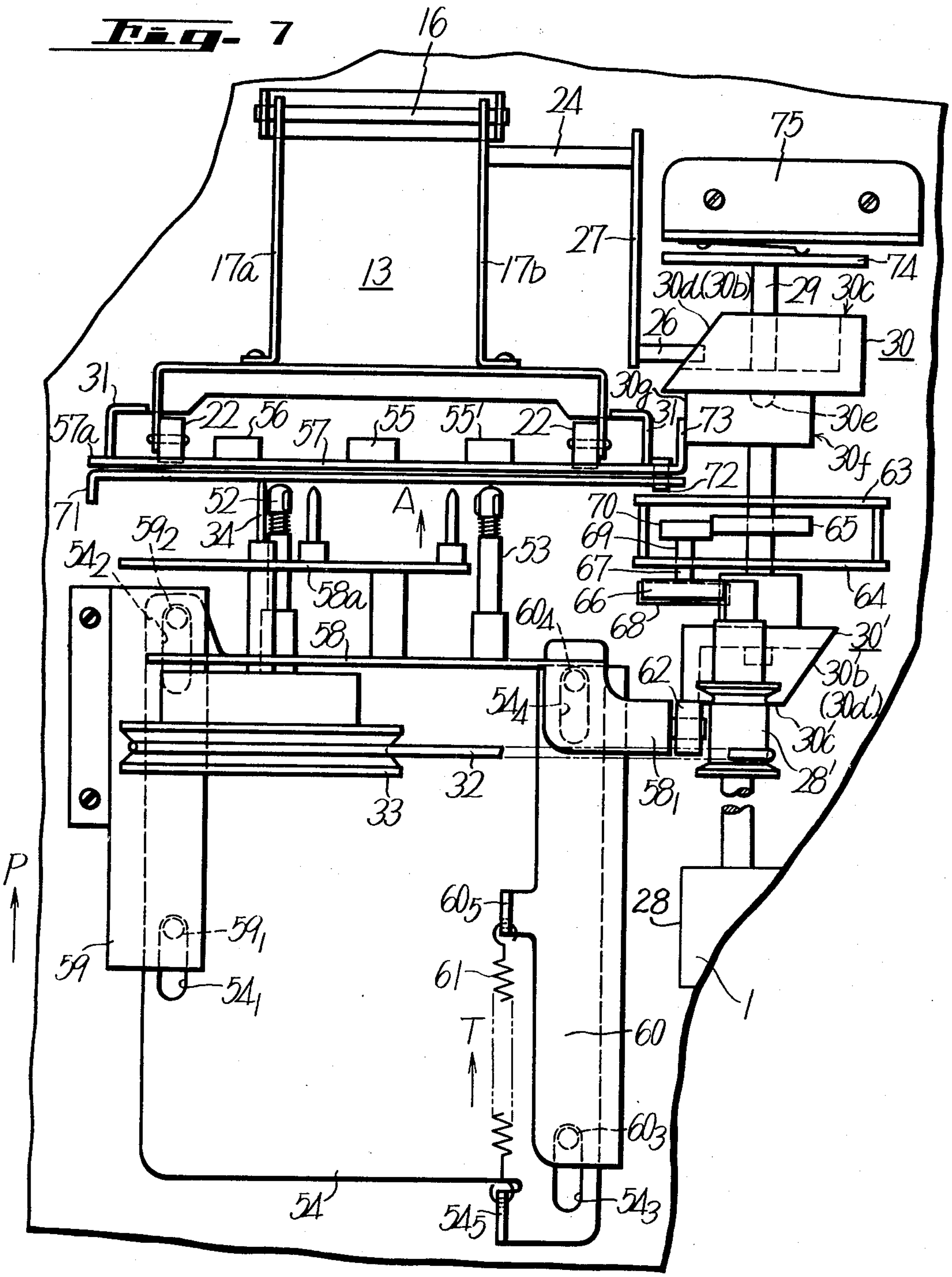
FIG. 7 is a bottom plan view of the portion illustrated in FIG. 1A.

Turning now to FIG. 7, a description will be given of means for playing back the tape cassette. On a bent plate portion 58 of a slide plate 54 there are mounted a flywheel 33, which is driven through a belt 32 stretched between it and a rotary shaft 28' of a motor 28 mounted on a stationary part, a capstan 34 (coaxial with the flywheel 33 in this example) driven by the flywheel 33, a tape take-up shaft 52 and a tape rewinding shaft 53. While, a magnetic head 55 and a pinch roller 56 are mounted on a support plate 57. Reference numeral 55' indicates an erasing head mounted on the support plate 57, which head serves as a tape guide during playback. For example, four elongated guide grooves $54_1$, $54_2$, $54_3$ and $54_4$ are bored in the slide plate 54. Support plates 59 and 60 are fixed to the top deck plate 1 and the slide plate 54 is slidably held between the support plates 59 and 60 and the top deck plate 1. In this case pins $59_1$, $59_2$ and $60_3$, $60_4$ are respectively planted on the support plates 59 and 60 at positions corresponding to the elongated grooves $54_1$ to $54_4$ of the slide plate 54 for loose engagement with the grooves. Reference numeral 61 designates a spring, which is stretched between a lug $54_5$ of the slide plate 54 and a lug $60_5$ of the support plate 60 and always biases the slide plate 54 in a direction of the arrow T, that is, pulls the capstan 34, the tape take-up reel shaft 52 and so on in the lengthwise direction of the guide groove 12. The aforementioned support plate 57 with the pinch roller 56 and the head 55 mounted thereon is journalled by a shaft 72 to a fixed support plate 71 extending substantially perpendicular to the top deck plate 1. The support plate 57 has provided thereon a drive arm 73 which is driven by the cam face 30f of the cam 30 as will be hereinbelow described later.

A description will be made in connection with the cams 30 and 30' for actuating the slide plate 54 and the support 57. On the right-hand side of the bent portion 58 of the slide plate 54 there is formed a support piece $58_1$ projecting to right, to the free end of which is journalled a roller 62. While, the cam 30' is affixed to the main shaft 29 of the cam 30 on the opposite side therefrom. The cam 30' has cam faces 30'*b*, 30'*c* and 30'*d* in substantially the same manner as the aforementioned cam 30 but the cam 30' is fixed to the shaft 29 in such a manner that its cam faces 30'*b*, 30'*c* and 30'*d* are respectively displaced about 180° apart from the cam faces 30*b*, 30*c* and 30*d* of the cam 30. The relationship between the both cams 30 and 30' is a follows. While the pin 26 remains in contact with the cam face 30*b* of the cam 30 for bringing down the cassette, the roller 62 makes contact with the cam face 30'*c* of the cam 30'. Namely, while the rollers 22 continues to fall, the slide plate 54 is held in its inoperative position (shown in FIG. 7 at which the capstan 34 and so on are held at their inoperative position). Then, until the pin 26 reaches substantially the center of the cam face 30*c* of the cam 30, the roller 62 remains in contact with the cam face 30'*d* of the cam 30'. Namely, while the rollers 22 reached their cassette playing position and are held there, the slide plate 54 is held at its operative position. After playing of the cassette, while the pin 26 makes contact with the cam face 30*d* following the latter half of the cam face 30*c*, the roller 62 moves on the cam face 30'*b* and then to the center of the cam face 30'*c*. That is, the slide plate 54 is pushed back against the force of the spring 61 to bring the capstan 34 and other members to their inoperative position, after which the rollers 22 are brought up.

Figure 8:
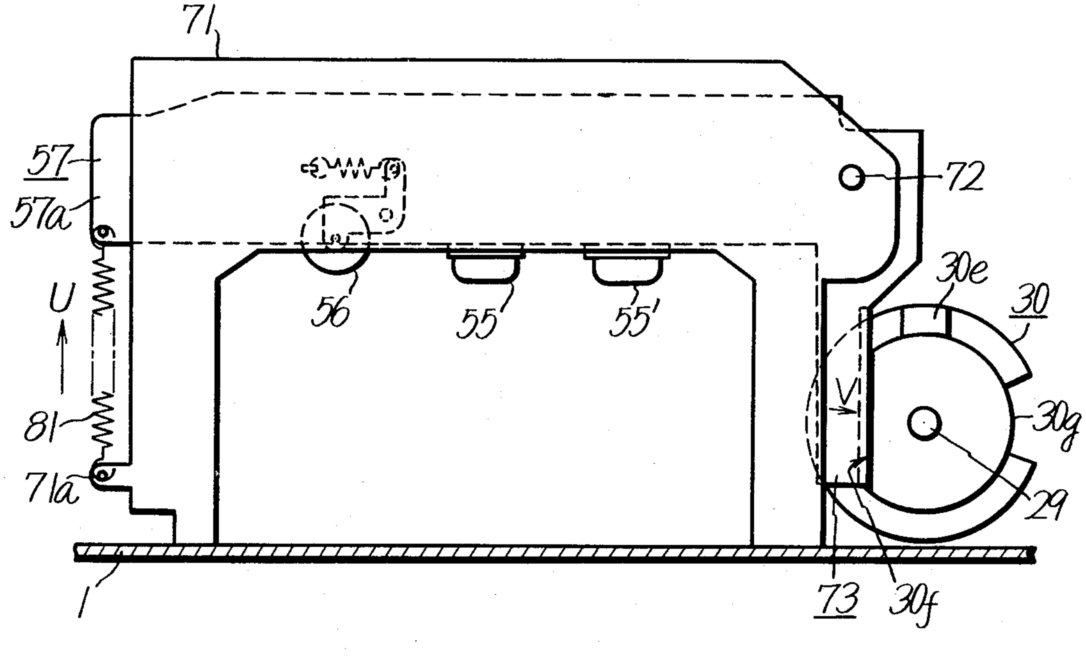
FIG. 8 is a side view of a fixed support plate viewed from a direction of the arrow A in FIG. 7.

In association with the rotary shaft 72 of the support plate 57 a drive arm 73 is provided on the opposite side from the head 55 and a spring 81 is stretched between the free end 57*a* of the support plate 57 on the side of the head 55 and a lug 71*a* provided on a support plate 71 fixed to the top deck plate 1 (refer to FIG. 8), by which the free end 57*a* is normally biased toward the top deck plate 1. Under the conditions shown in FIG. 7, the end portion of the drive arm 73 on the side of the top deck plate 1 is in contact with a cam face 30*g* of the cam 30, in which case the drive arm 73 is pushed in a direction of the arrow U in FIG. 8, that is, in a direction in which the left-hand end portion 57*a* of the support plate 57 in FIG. 7 is drawn apart from the top deck plate 1 against the force of the aforementioned spring 81. When the cam face 30*f* of the cam 30 moves into contact with the end portion of the drive arm 73, the end portion of the drive arm 73 rotates about the shaft 72 in a direction of the shaft 29, that is, in a direction of the arrow V (in FIG. 8), since the cam face 30*f* is depressed more than the cam face 30*g* as depicted in FIG. 8. As a result of this, the left-hand end portion 57*a* of the support plate 57 is pulled by the spring 81 in a direction of the top deck plate 1, thereby causing the head 55 and the pinch roller 56 mounted on the support plate 57 to be operative.

Figure 9:
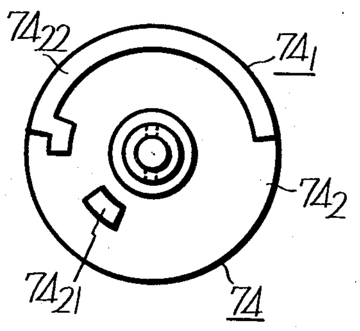
FIG. 9 is a front view of a disc member of a rotary switch shown in FIG. 7.
Figure 10:
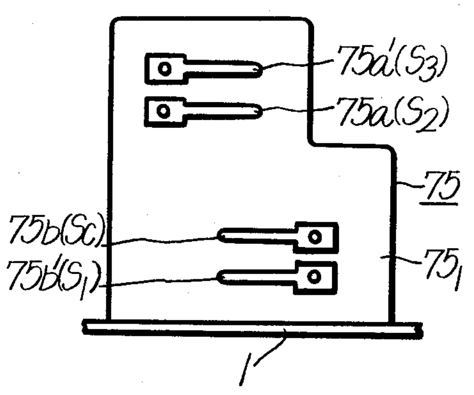
FIG. 10 is a front view of a contact portion of the rotary switch.

In FIG. 7 reference numeral 74 designates a disc-shaped rotary switch affixed to the free end of the main shaft 29 on the side of the cam 30. The switch 74 consists of a disc $74_1$ formed of an insulating material such, for example, as bakelite, a contact plate $74_2$ formed of a conductive material such as copper and fixedly mounted on one side of the disc $74_1$ as depicted in FIG. 9 and a contact device 75 shown in FIG. 10. The contact device 75 is made up of a support plate $75_1$ formed of a plastic or like insulating material and fixed to the top deck plate 1 in a manner to extend down therefrom and contact pieces 75*a*, 75*a*' and 75*b*, 75*b*' mounted on the support plate $75_1$, as illustrated in FIG. 10. The contact pieces 75*a*, 75*a*' and 75*b*, 75*b*' are each fixed at one end to the support plate $75_1$ and formed at the other end to make contact with the contact plate $74_2$ of the disc $74_1$, in which case the contact plate $74_2$ has cutouts or insulating portions $74_{21}$ and $74_{22}$ as shown in FIG. 9.

Figure 11:
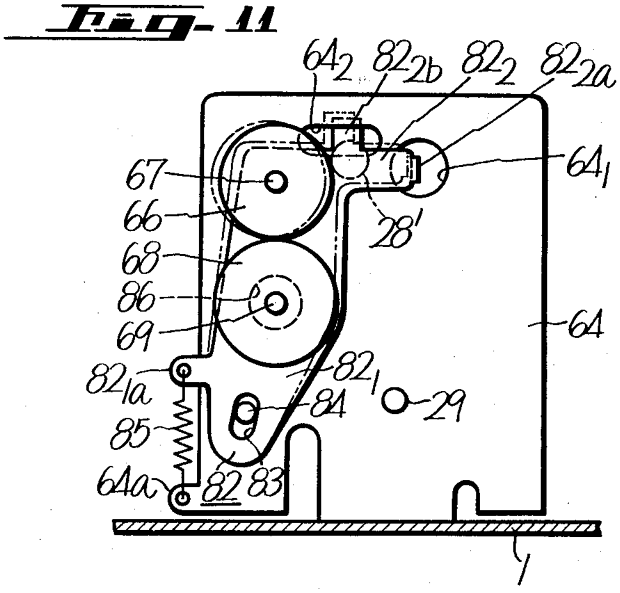
FIG. 11 is a side view, similar to FIG. 8, showing a mechanism for selectively transmitting the driving force of a motor.
Figure 12:
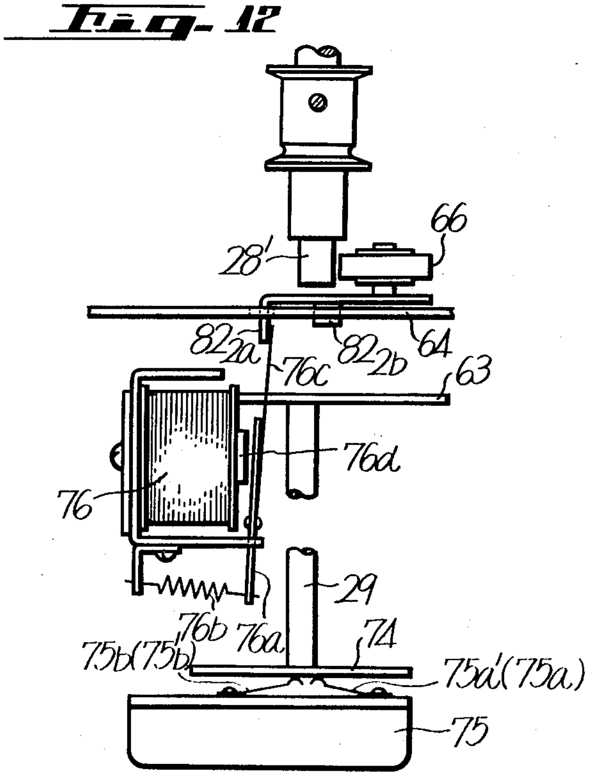
FIG. 12 is a plan view schematically showing members for actuating the transmission mechanism depicted in FIG. 11.

Referring to FIGS. 7, 11 and 12, a description will be given of a clutch mechanism for selectively driving the main shaft 29 having the cams 30 and 30'. The main shaft 29 is rotatably supported by brackets 63 and 64 fixed to the underside of the top deck plate 1 substantially perpendicular thereto. A gear 65 is fixed to the main shaft 29 between the brackets 63 and 64. While, a shaft 67 rotatably supporting at one end a roller 66 is movably attached at the other end to one bracket, for example, 64. Namely, the shaft 67 is fixed to the bent portion of a substantially L-shaped lever 82 and a slot 83 is formed in the end portion of one arm $82_1$ of the lever 82, while a pin 84 is planted on the bracket 64 and is loosely inserted into the matter slot 83 of the lever 82 to pivotally support the lever 82 on the support plate 64. Further, an end portion $82_{2a}$ of the other arm $82_2$ of the lever 82 projects out toward the support plate 63 through a window $64_1$ bored in the support plate 64. The arm $82_2$ of the lever 82 has an engaging piece $82_{2b}$ which projects out toward the support plate 63 through a slot $64_2$ bored in the support 64 and is bent to engage the support plate 64 on the side of the support plate 63. Further, the arm $82_1$ has a projection $82_{1a}$ and a spring 85 is stretched between the projections $82_{1a}$ and a lug 64*a* of the support plate 64, thereby biasing the L-shaped lever 82 to hold the roller 66 normally out of contact with the shaft 28' of the motor 28 as indicated by broken lines in FIG. 11. It is a matter of course that an aperture 86 is bored through the lever 82 at a place corresponding to a shaft 69 to permit free rotation of the lever 82. The shaft 69, one end of which has affixed thereto a roller 68 engaging the roller 66, is rotatably supported at the other end to the support plate 64. A gear 70 is fixedly mounted on the shaft 69 at that portion extending between the support plates 64 and 63 and the gear 70 is meshed with the aforementioned one 65 mounted on the shaft 29. Of course, these gears 65 and 70 may be meshed with each other through a gear train.

Next, a description will be made in connection with means for selectively bringing the roller 66 into contact with the shaft or pulley 28' of the motor 28. As illustrated in FIG. 12, an electromagnet 76 is mounted on the support plate 63; a magnetic piece 76*a* is rotatably supported in association with the electromagnet 76; a spring 76*b* is stretched between one end of the magnetic piece 76*a* and a stationary portion; and a resilient piece 76*c* is fixed at one end to the other end of the magnetic piece 76*a* and is engaged at the other end with the projecting end $82_{2a}$ of the arm $82_2$ of the L-shaped lever 82.

In FIG. 12 the electromagnet 76 is held unexcited, in which case the spring 76*a* biases the magnetic piece 76*a* to keep its one end away from a magnetic pole 76*d* of the electromagnet 76. Further, in such a case the resilient piece 76*c* is caused to make light contact with the projecting end $82_{2a}$ of the L-shaped lever 82 to permit disengagement of the roller 66 from the shaft 28' of the motor 28 as depicted.

The clutch mechanism described above is only to selectively bring the roller 66 into rotary contact with the motor shaft 28 and remarkedly reduces inertial moment of the rotary members to be driven, and hence avoids their overruning or the like, thus ensuring accurate control thereof.

Turning now to FIGS. 13A to 13E, a description will be given of a tape detecting device for detecting the presence of the tape, its running or standstill condition. As shown in FIGS. 13A to 13D, the tape detecting device consists mainly of a pinch roller 56, a bracket 56*a* supporting it and a capstan 34. Namely, the bracket 56*a* is formed of, for example, a conductive material and the pinch roller 56, which is rotatably supported by the bracket 56*a* through a pin $56a_1$, is made up of a conductive metal columnar member $56_1$ rotatably mounted on the pin $56a_1$ and a roller member $56_2$ formed of a conductive resilient material such as a conductive rubber and fixedly mounted on the periphery of the metal columnar member $56_1$. If necessary, a conductive metal bushing $56_3$ may be interposed between the columnar member $56_1$ and the roller member $56_2$. With the above arrangement, the bracket 56*a*, the shaft $56a_1$, the columnar member $56_1$ and the roller member $56_2$ may be regarded as constituting an electrically connected circuit. Insulating members $56_4$ as of bakelite or a plastic material are separately embedded in one end face of the metal columnar member $56_1$ of the pinch roller 56 (in FIG. 13A the face lying on the sheet of the drawing and in FIGS. 13C and 13D the left-hand face) in such a manner that the conductive material of the columnar member $56_1$ and the insulating material $56_4$ are alternately arranged on that end face of the columnar member $56_1$. A brush $56a_2$, whose one end is always in contact with that end face of the columnar member $56_1$, is secured at the other end to the bracket 56*a* through insulating spacers $56a_3$ and $56a_4$. Reference numeral $56a_5$ indicates a pin by means of which the bracket 56*a* is pivoted to a support plate 57 not shown in FIG. 13A but depicted in FIG. 7. Reference numeral $56a_6$ designates a spring stretched between the plate 57 and the bracket 56*a* for suitably biasing the latter, by which the pinch roller 56 supported by the bracket 56*a* is caused to press a magnetic tape T against the conductive capstan 34 at a suitable pressure.

Figure 13A:
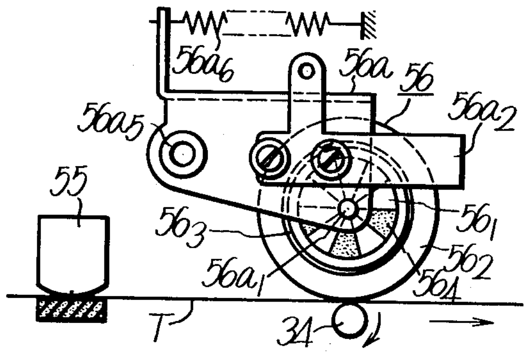
FIGS. 13A to 13D are schematic diagrams, for explaining one example of tape detecting means shown in FIG. 7.
Figure 13B:
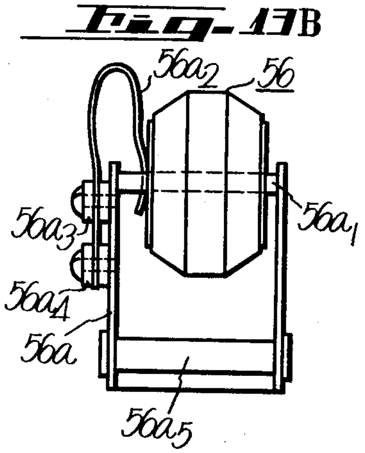
Figure 13C:
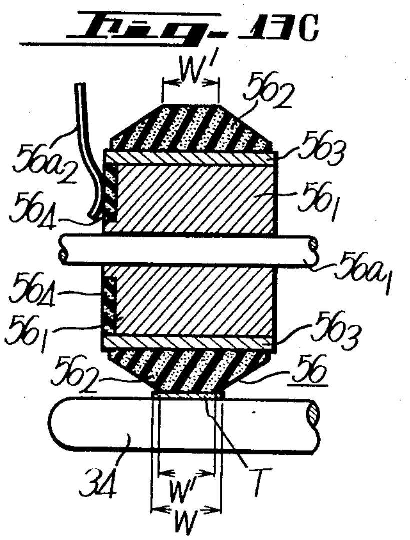
Figure 13D:
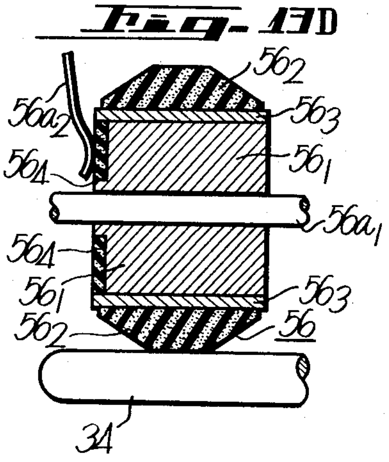
Figure 13E:
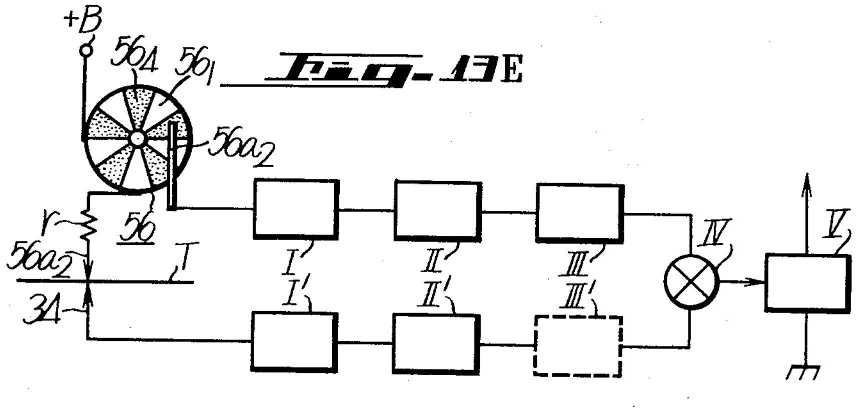
FIG. 13E is a block diagram, for explaining the operation of the tape detecting means.

Referring now to FIG. 13E, the operation of the above tape detecting device will hereinbelow be described. Reference numeral I indicates an electronic circuit block for AC amplification or eliminating a DC component and its input side is connected to the brush $56a_2$. Reference numeral II designates a circuit for rectifying the output of the electronic circuit block I, I' an amplifier circuit which operates by a potential produced by the contact of the pinch roller 56 with the capstan 34, II' a circuit for rectifying the output of the amplifier circuit I', and III a signal converter which is incorporated in such a manner that the output signals of the rectifier circuit II or II' representative of the stop and absence of the tape are in phase with each other. The signal converter III is such that when supplied with a DC signal from the rectifier circuit II, the converter blocks the DC signal and in the absence of the DC signal it produces a DC signal. Further, the signal converter III may be placed at a stage following the rectifier circuit II or II'. Reference numeral IV identifies a signal mixer for mixing the signals derived from the converter III and the rectifier circuit II' and V a switch circuit for switchingly controlling an output circuit having a relay and the like as loads with the signal derived from the mixer IV.

1. In the event that the tape T exists and is running between the capstan 34 and the pinch roller 56, the conductive columnar member $56_1$ and the conductive roller member $56_2$ are biased relative to a reference potential (for example, the earth potential), so that a rectangular wave or AC signal and a DC component are supplied superimposed from the brush $56a_2$ to the electronic circuit block I to remove the DC component and only the AC component is rectified by the rectifier circuit II to derive therefrom a DC output.

2. When the tape T exists between the capstan 34 and the pinch roller 56 and stands still, no signal or a DC signal is derived from the brush $56a_2$ and the DC signal is removed by the electronic circuit block I, so that the output of the rectifier circuit II is zero.
3. In the presence of the tape T between the capstan 34 and the pinch roller 56, the input of the amplifier circuit I' is zero and consequently the output of the rectifier circuit II' is also zero.
4. In the absence of the tape T between the capstan 34 and the pinch roller 56, the roller member $56_2$ and the capstan 34 are continuously engaged each other under normal conditions but when bad contact occurs between them due to dust or the like they make intermittent contact with each other. In the former case a DC-like signal is produced and in the latter case an AC-like signal is generated and the resulting signals are amplified by the amplifier circuit I' and then rectified by the rectifier curcuit II' and, in either case, a DC output is derived from the rectifier circuit II'. It is a matter of course that the rectifier circuit II' is designed to have a phase permitting the passage therethrough of the input DC signal.

In the control of a tape recorder the same control is required in the both cases above described in (2) and (4). This requires the output signals in the both cases to be of the same kind. To this end, the signal converter circuit III is provided at the stage following the rectifier circuit II and the control switch circuit V is actuated through the signal mixer circuit or "or-gate" circuit IV in a manner to achieve the same operation in either case.

In the latter case, even if the pinch roller 56 and the capstan 34 make slight contact with each other in the absence of the tape T therebetween, control operation can be achieved by increasing the amplification degree of the amplifier circuit I', so that stable and highly sensitive control can be carried out.

Further, the rise-up time constant of the rectified output of the rectifier circuit II' can be reduced relative to the rectifier circuit II, so that in the absence of the tape T the control circuit can be actuated in a moment irrespective of the numbers of the conductive members and the insulating members $56_1$ and $56_4$, which will mean that the operation of the device can be attained rapidly.

The arrangements of the circuits I, II, III, I', II', III', IV and V shown in FIG. 13E need not always be limited specifically thereto and may be suitably changed within the scope of attainment of the above-described object and, further, the circuit elements may also be increased or decreased in number as desired.

As has been described in the foregoing, the tape detecting device of this invention does not take out any signal output from a reel shaft or the like as in the prior art but, instead, the device directly employs as the signal detecting means the combination of the capstan and the pinch roller which rotate irrespective of the condition of the tape, so that the tape detecting device is not affected by slackness of the tape wound on the reel shaft, the condition of the winding of the tape or the like. In addition, since there is no variation in the revolving speed which results from a difference in diameter of the tape winding at the outer and inner convolutions thereof, an output signal of a constant frequency can be produced at all times, and accordingly the rise-up time constant of the control operation can be extremely reduced without fail.

Figure 14:
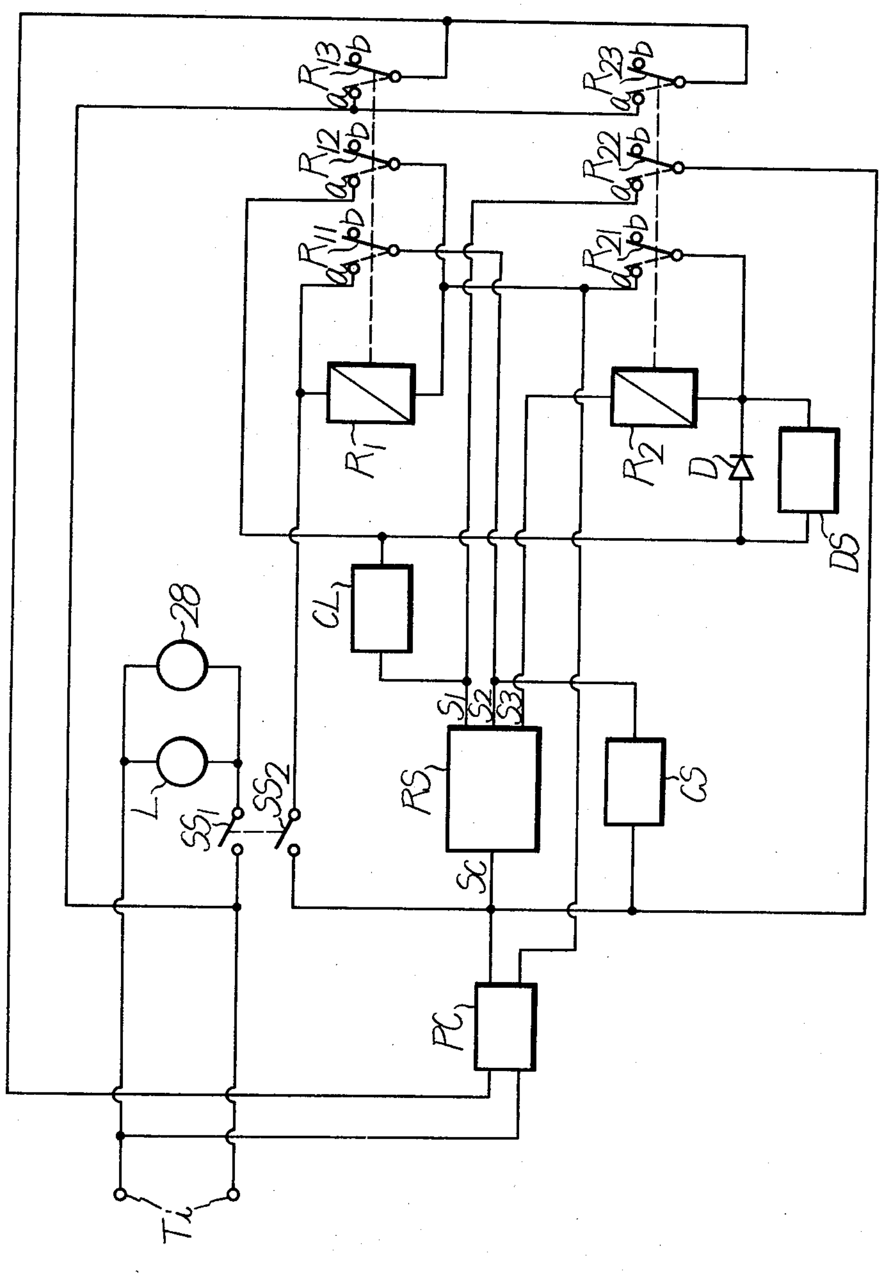
FIG. 14 is a schematic diagram illustrating one example of an electric circuit used in the apparatus of this invention.

With reference to FIG. 14 one example of the electric control circuit of the above apparatus of this invention will hereinbelow be described. In the figure reference character Ti indicates power source input terminals of the apparatus, $SS_1$ and $SS_2$ ganged switches corresponding to switches 94, 94 in FIG. 1C, CL the clutch mechanism for controlling the shaft 29, previously described with FIGS. 11 and 12, RS the rotary switch described with FIGS. 9 and 10, and CS a control switch in which the switch 80 of the tape cassette extreme position detecting device and the changeover switch 96 previously described with FIGS. 1A, 1B and 1C are connected in series to each other. Reference character DS designates a parallel circuit of a detecting switch provided in association with the pinch roller 56 and a reject switch for stopping playback of the tape, $R_1$ and $R_2$ relays respectively having interlocking movable contact pieces $R_{11}$, $R_{12}$, $R_{13}$ and $R_{21}$, $R_{22}$, $R_{23}$, and PC a power source converter. The converter PC achieves voltage conversion or AC-to-DC conversion when an AC signal is applied to the input terminals Ti, and the converter PC becomes unnecessary when the motor power source can be used for the control circuit in common. Reference character L designates a pilot lamp indicating the power source input.

Referring now to FIGS. 14 and 15, a description will be given of the operation of the apparatus of this invention described above.

Figures 15A, 15B, 15C, 15D, 15E, 15F, 15G, 15H, 15I, 15J, 15K, 15L, 15M:
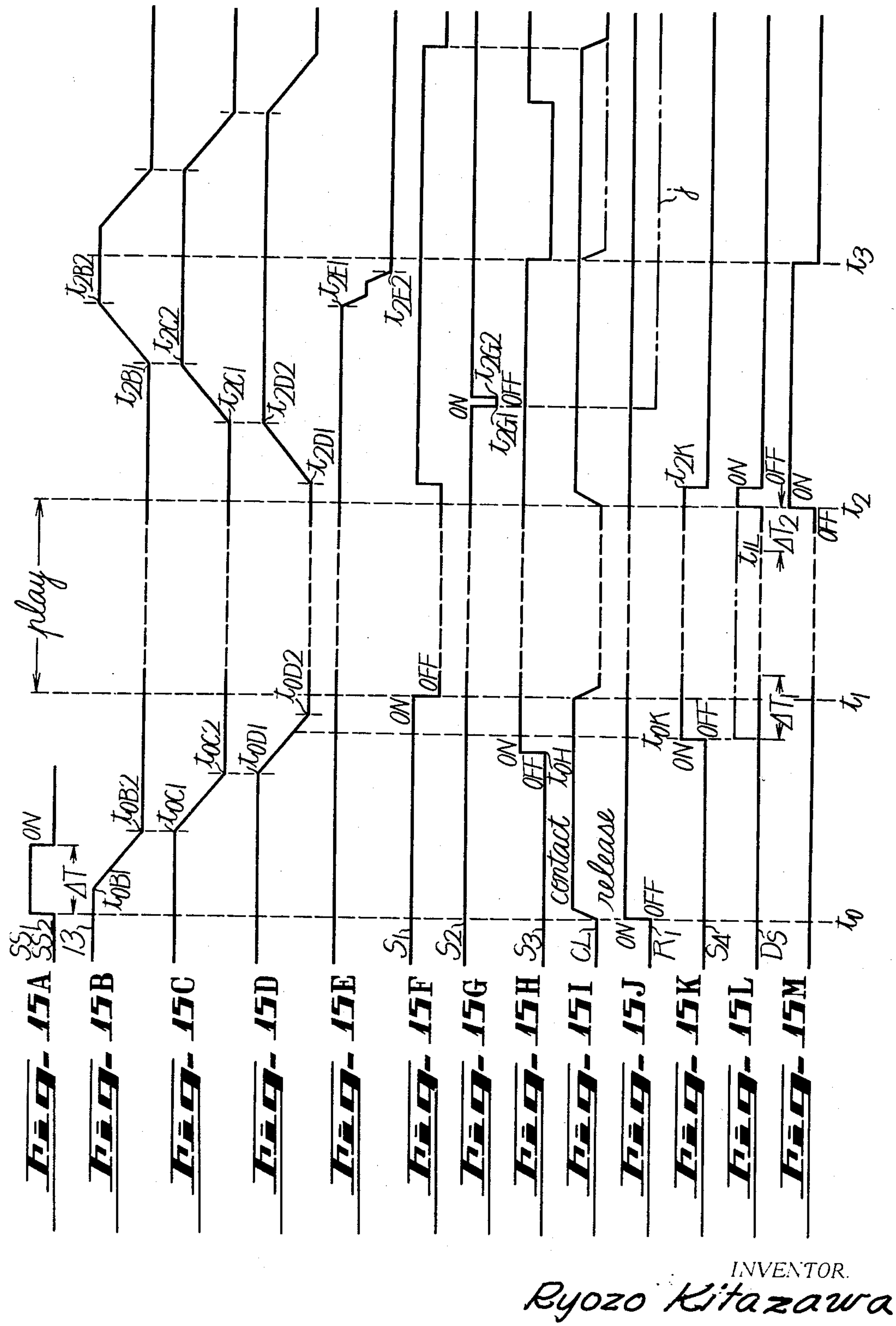
FIG. 15 is a schematic diagram, for explaining the operation of the apparatus of this invention in terms of time.

When the switches $SS_1$ and $SS_2$ are held in the on state for a short period of time $\Delta T$ from a time $t_0$ as depicted in FIG. 15A, there are closed circuits from the input terminal Ti through the switch SSi and the motor 28 back to the input terminal Ti and from the input terminal Ti through the switch $SS_1$ and the pilot lamp L back to the input terminal Ti, thereby starting the motor 28 and lighting the pilot lamp L. While, a circuit is closed from the input terminal Ti, through the switch $SS_1$, the converter PC, the switch $SS_2$, the relay $R_1$ and the converter PC back to the input terminal Ti, thereby energizing the relay $R_1$. As a result of this, the relay contact pieces $R_{11}$, $R_{12}$ and $R_{13}$ are turned down to contacts *a* (as indicated by broken lines in FIG. 14) from the illustrated positions, that is, from contacts *b*. In such a case the rotary switch RS is in the following condition. Namely, one end of a common contact Sc (corresponding to the contact pieces 75*b* in FIG. 10) is connected through the converter PC to one of the input terminals Ti and the other end of the common contact Sc and one end of a contact $S_2$ (corresponding to the contact pieces 75*a* in FIG. 10) are held in contact with the contact plate $74_2$, the other end of the contact $S_2$ being connected to the movable contact piece $R_{11}$ or the relay $R_1$. Accordingly, once the switch $SS_2$ has closed the power source circuit to energize the relay $R_1$, the contact pieces $R_{11}$, $R_{12}$ and $R_{13}$ of the relay $R_1$ are turned down to the contacts *a* as above described to provide a closed circuit from the input terminal Ti through the contact piece $R_{13}$, the converter PC, the common contact Sc, the contact $S_2$, the contact piece $R_{11}$, the relay $R_1$ and the converter PC back to the input terminal Ti, thereby constituting a self-holding circuit of the relay $R_1$. Namely, even when the switches $SS_1$ and $SS_2$ are opened after the elpse of time $\Delta T$, the relay $R_1$ is held in its energized condition, which is depicted in FIG. 15J. While the relay $R_1$ is energized, there are respectively closed circuits from the input terminal Ti through the relay contact piece $R_{13}$ and the motor 28 back to the input terminal Ti and from the input terminal Ti through the pilot lamp L and the relay contact piece $R_{13}$ back to the input terminal Ti, driving the motor 28 and lighting the lamp L. While the switches $SS_1$ and $SS_2$ are closed or the relay $R_1$ is energized, a circuit is closed from the input terminal Ti through the switch $SS_1$ or the relay contact piece $R_{13}$, the converter PC, the common contact Sc, a contact $S_1$, the clutch mechanism CL, the relay contact piece $R_{12}$ and the converter PC to the input terminal Ti, by which the electromagnet 76 shown in FIG. 12 is energized to bring the roller into rotary contact with the motor shaft 28' and the roller 68, causing the main shaft 29 to be driven through the gear mechanism 65 and 70. This leads to rotation of the cams 30 and 30' depicted in FIG. 7. Turning now to FIGS. 15B, 15C and 15D, a description will hereinbelow be made in connection with the conditions resulting from the operation of the cams. While the player of this invention is in its inoperative condition, the pin 26 contacts the cam face 30*a* of the cam 30 and when the cam 30 has begun to rotate with the rotation of the main shaft 29, the pin 26 slides on the cam face 30*a* and has passed it and then the pin 29 is brought into contact with the cassette lowering cam face 30*b* at a time $t_{0B1}$ and held in engagement with the can face 30*b* until a time $t_{0B2}$ to lower the cassette support arm 13, thus bringing the tape cassette down to its playback position. This is shown in FIG. 15B. While, the roller 62 of the slide plate 54 which has been held in contact with the cam face 30'*c* of the cam 30' (refer to FIG. 7) gets into contact with the cam face 30'*b* substantially at a time $t_{0B2}$, that is, $t_{0C1}$, thereby moving the slide plate 54 in the direction of the arrow T to bring the tape take-up and rewinding shafts 52 and 53 and the capstan 34 to their operative positions, namely under the guide hole 12. This operation ends at a time $t_{0C2}$ as shown in FIG. 15C. Further, the drive arm 73 of the head support plate 57 which has been urged against the cam face 30*g* of the cam 30 gets into contact with the cam face 30f substantially at the time $t_{0C2}$, that is, at a time $t_{0D1}$ (refer to FIG. 8), by which the head 55 and the pinch roller 56 mounted on the support plate 57 are brought to their operative positions at a time $t_{0D2}$. This is depicted in FIG. 15D. At a time $t_{0K}$ between the times $t_{0D1}$ and $t_{0D2}$ the switch $S_4$ provided in association with the support plate 57 is closed to put the detecting circuit DS into its stand-by condition after a time $\Delta T_1$. Turning on the switches $SS_1$ and $SS_2$, the tape cassette is brought to its playback position and the tape drive mechanism is assembled with the tape cassette and then the playback device is brought into engagement with the cassette, as above described. At a time $t_1$ the contact piece 75*b'* shown in FIG. 10 (corresponding to the switch $S_1$) is disengaged by the rotation of the main shaft 29 from the contact plate $\mathbf{74}_2$ depicted in FIG. 9, thereby opening the closed circuit from the input terminal Ti through the relay contact piece $R_{13}$, the converter PC, the common contact Sc, the contact $S_1$, the clutch mechanism CL, the relay contact piece $R_{12}$ and the converter PC back to the input terminal Ti to release the clutch mechanism CL. Namely, the roller 66 is disengaged from the shaft 28' of the motor 28 to stop the rotation of the main shaft 29 and the shaft 29 is held at a standstill. At a desired time $t_{0H}$ between the times $t_0$ and $T_1$ the contact $S_3$ is turned on, that is, one end of the contact 75*a'* depicted in FIG. 10 engages the contact plate $\mathbf{74}_2$ shown in FIG. 9. FIG. 15 shows the tape playback condition after the time $t_1$.

Upon completion of the tape playback at a time $t_{1L}$, the tape detecting device described with FIG. 13 detects stoppage of the tape at a time $t_2$ $(= t_{1L} + \Delta t_2)$ and the switching circuit DS is thereby closed concurrently at the time $t_2$, thereby closing a circuit from the input terminal Ti through the relay contact piece $R_{13}$, the converter PC, the common contact Sc, the contact $S_3$, the relay $R_2$, the parallel circuit DS, the relay contact $R_{12}$ and the converter PC back to the input terminal Ti to energize the relay $R_2$. This causes the relay contact pieces $R_{21}$, $R_{22}$ and $R_{23}$ to be changed over to the contacts *a* as indicated by broken lines in FIG. 14, by which is closed a self-maintaining circuit of the relay $R_2$ from the input terminal Ti through the relay contact piece $R_{13}$, the converter PC, the common contact Sc, the contact $S_3$, the relay $R_2$, the relay contact piece $R_{21}$ and the converter PC back to the input terminal Ti, thereby causing the relay $R_2$ to be self-maintaining. Closing of the relay $R_2$ leads to closing a circuit from the input terminal Ti through the relay contact piece $R_{13}$, the converter PC, the relay contact piece $R_{22}$, the clutch mechanism CL, the relay contact piece $R_{12}$ and the converter PC back to the input terminal Ti, thereby to actuate the clutch mechanism CL to start rotation of the main shaft 29.

With the rotation of the main shaft 29 from a time $t_{2D1}$ to $t_{2D2}$, the cam 30 is rotated to bring the drive arm 73 of the support plate 57 into contact with the cam face 30*g* of the cam 30. As a result of this, the support plate 57 is turned about the pivot 72 in a direction of the arrow U in FIG. 5 against the force of the spring 81 to bring the head 55 and the pinch roller 56 out of contact with the tape of the cassette. This operation ends at the aforementioned time $t_{2D2}$. At substantially the same time $t_{2C1}$ as that $t_{2D2}$, the cam 30' rotates with the rotation of the main shaft 29 from the time $t_{2C1}$ to $t_{2C2}$, during which the slide plate 54 is shifted by the engagement of the roller 62 with the cam face 30'*d* of the cam 30' in a direction reverse to that of the arrow T against the force of the spring 61 to retract the pinch roller 56 and the tape rewinding and take-up shafts 52 and 53 to their inoperative positions. At the time $t_{2C2}$, namely upon completion of the retracting motion the roller 62 is in contact with the cam face 30'*c* of the cam 30' to hold the slide plate 54 in its retracted position.

While, at substantially the same time $t_{2B1}$ as that $t_{2C2}$ the pin 26 gets into contact with the cam face 30*d* of the cam 30 with the rotation of the main shaft 29 between the times $t_{2B1}$ and $t_{2B2}$ and the cassette support 13 starts to be lifted by the spring 23 up to a position where the cassette is brought back to its initial position in the cassette support frame 2. This operation ends at the time $t_{2B2}$. Thereafter, the cassette support 13 is held in its lifted position by the spring 23.

Further, at substantially the same time $t_{2E1}$ as that $t_{2B2}$ the bent portion 48 gets into contact with the cam face 30e of the cam 30 with the rotation of the main shaft 29 between the times $t_{2E1}$ and $t_{2E2}$ and the rotary plate 43 of the cassette support frame drive means 35 is thereby caused to turn against the force of the spring 47 to drive the tooth 46 of the ratchet wheel 39 with the lugs 45a and 45b of the rotary plate 43, with the result that the gear 37 meshing with the rack 38 of the cassette support frame 2 is turned by the stored force of the coil spring 40, thereby moving the cassette support frame 2 in the direction of the arrow R by one pitch (refer to FIG. 1A). This operation ends at a time $TT_{2E2}$. The main shaft 29 continues to rotate for a very short time after the time $t_{2E2}$, that is, until a time $t_3$, at which the switch $S_3$ of the rotary switch RS is turned off. Namely, the contact piece 75a' shown in FIG. 10 disengages from the contact plate $74_2$ depicted in FIG. 9 to open the closed circuit from the input terminal Ti through the relay contact piece $R_{13}$, the converter PC, the common contact Sc, the contact $S_3$, the relay $R_2$, the relay contact piece $R_{21}$, and the converter PC back to the input terminal Ti, thereby opening the self-maintaining circuit of the relay $R_2$. This is illustrated in FIG. 15M.

The time between the times $t_0$ to $t_3$ is one typical cycle of the recording or playback operation of one tape cassette of the apparatus according to the present invention. Accordingly, the apparatus of this invention is in substantially the same condition at the times $t_3$ and $t_0$ except in that the relay $R_1$ is in its excited condition and that the cassette support frame 2 has been moved by one pitch in the direction of the arrow R. Consequently, since the relay $R_1$ is held excited after the time $t_3$, the playback operation described above is repeatedly carried out without the necessity of turning on the start switches $SS_1$ and $SS_2$. From a time $t_{2G1}$ to $t_{2G2}$ between the times $t_2$ and $t_3$, the switch $S_2$ of the rotary switch RS is open as shown in FIG. 15G, namely the contact piece 75a depicted in FIG. 10 disengages from the contact plate $74_2$ of FIG. 9 but the control switch CS depicted in FIG. 14 remains closed, so that self-holding of the relay $R_1$ is maintained by the closed circuit from the input terminal Ti through the relay contact piece $R_{13}$, the converter PC, the control switch CS, the relay contact piece $R_{11}$, the relay $R_1$ and the converter PC back to the input terminal Ti.

When the cassette support frame 2 has been brought to its extreme position, the normally closed switch 80 shown in FIGS. 1A and 1B is opened by the cassette support frame 2 and, in other words, the control switch CS depicted in FIG. 14 is opened. However, the relay $R_1$ still remains excited, since its self-maintaining circuit from the input terminal Ti through the relay contact piece $R_{13}$, the converter PC, the common contact Sc, the contact $S_2$, the relay contact piece $R_{11}$, the relay $R_1$ and the converter PC back to the input terminal Ti is still closed as will be apparent from FIG. 14. Accordingly, playback of the final cassette is achieved in the same manner as those of the preceding cassettes described above. After completion of the playback of the last cassette, that is, at a time $t_{2G1}$ after the time $t_2$ the switch $S_2$ of the rotary switch RS is open from the time $t_{2G1}$ to $t_{2G2}$ and, in other words, the contact piece 75a shown in FIG. 10 is out of contact with the contact plate $74_2$ depicted in FIG. 9 from the time $t_{2G1}$ to $t_{2G2}$. At this time the control switch CS is open as above described, so that the aforementioned self-maintaining circuit of the relay $R_1$ is opened to deenergize the relay $R_1$. Then, even if the switch $S_2$ is closed again, the relay $R_1$ is not ever energized, since the start switches $SS_1$ and $SS_2$ are held open. This condition of the relay $R_1$ is indicated by a broken line *j* in FIG. 15J. With the deenergization of the relay $R_1$, the relay contact pieces $R_{11}$, $R_{12}$ and $R_{13}$ are respectively returned from the contacts *a* to *b* (as indicated by the full lines in FIG. 14). At this time $t_{2G1}$, however, the relay $R_2$ is still energized because its self-maintaining circuit remains closed as shown in FIG. 15M. Consequently, the circuit from the input terminal Ti through the relay contact piece $R_{23}$ and the motor 28 back to the input terminal Ti is held closed, so that the motor 28 is rotating. Further, since the circuit from the input terminal Ti through the relay contact piece $R_{23}$, the converter PC, the common switch Sc, the contact $S_3$, the relay $R_2$, the relay contact piece $R_{21}$ and the converter PC back to the input terminal Ti is also held closed, the self-holding of the relay $R_2$ is continued. In addition, the circuit from the input terminal Ti through the relay contact piece $R_{23}$, the converter PC, the common switch Sc, the switch $S_1$, the clutch mechanism CL, the diode $D_1$ the relay contact piece $R_{21}$ and the converter PC back to the input terminal Ti also remains in its closed condition, so that the clutch mechanism CL is held in its engaged condition. Namely, the main shaft 29 continues to rotate. Thereafter, at the time $t_3$ the switch $S_3$ is opened, namely the contact piece 75a' disengages from the contact plate $74_2$ to open the self-maintaining circuit of the relay $R_2$, thereby to deenergize the relay $R_2$, so that its relay contact pieces $R_{21}$, $R_{22}$ and $R_{23}$ are turned down to the contacts *b* (indicated by the full lines) from the contacts *a*. Thus, the circuits including the relay contact pieces $R_{21}$, $R_{22}$ and $R_{23}$ are all opened and drivings of the motor 28 and so on are stopped to render the apparatus inoperative.

In the case of stopping playback of the cassette during its playback operation, the right-hand outermost one of the push buttons 91 shown in FIG. 1C is pushed on, by which one of the detecting switches DS (not shown) corresponding to the push button is closed to complete a closed circuit from the input terminal Ti through the relay contact piece $R_{13}$, the converter PC, the common switch Sc, the switch $S_3$, the relay $R_2$, the detecting switch DS, the relay contact piece $R_{12}$ and the converter PC back to the input terminal Ti to energize the relay $R_2$, thereby achieving the operations after the time $t_2$ previously described in connection with FIG. 15.

When no cassette lies on the guide hole 12 or the cassette is mounted in the support frame 2 in an incorrect manner, the aforementioned tape detecting means does not engage the tape, so that the tape detecting means closes the detecting switch DS to place the apparatus under the conditions corresponding to the time $t_2$ and cause the apparatus to achieve the operations previously described.

Although a description has already been given of the detecting switch DS by way of exemplifying a switch closing its circuit for detecting the presence of the tape and energizing the relay $R_2$ in connection with FIG. 13, another modification of the detecting means will hereinbelow be described with reference to FIGS. 16A and 16B. In the figures reference numeral 100 designates a tape detecting device which is supported by the vertical bent portion 58 of the slide plate 54 and the support plate 58a extending in parallel to the portion 58 and is arranged to be slidable in a direction parallel with the direction of the sliding movement of the slide plate 54 (indicated by the arrow T in FIG. 7). The tape detecting device 100 is designed such that its top end portion 100 a may engage one side of the cassette, for example, the side 5a facing the slide plate 54. Further, a conductive contact portion 100b is provided on the detecting device 100 and a spring 101 is forcibly interposed between the bent portion 58 and the conductive contact portion 100b, thereby always biasing the tape detecting device 100 toward the cassette playback position. While, a contact 102 is fixedly mounted through, for example, insulating members 102a and 102b on the support plate 64 secured to the top deck plate 1.

Figure 16A:
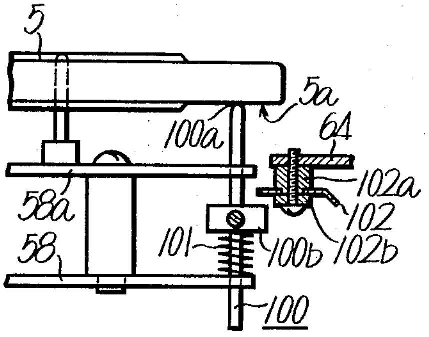
FIGS. 16A, 16B 17A, 17B are schematic diagrams illustrating other examples of the tape detecting means depicted in FIG. 13.
Figure 16B:
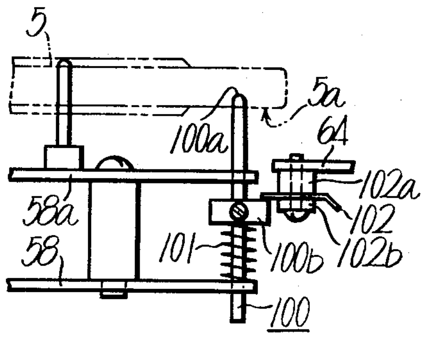

With such an arrangement, when the tape to be played back exists, that is, when the cassette has been lowered to its playback position at the time $t_{0B2}$ in FIG. 15, the slide plate 54 gradually slides toward the cassette between the times $T_{0C1}$ and $t_{0C2}$ as illustrated in FIG. 16A and the plate 54 reaches its extreme position at the time $t_{0C2}$ but the conductive contact portion 100b is prevented from movement toward the cassette against the force of the spring 101 and stops relative to the top deck plate 1. Consequently, the conductive contact portion 100b does not engage the contact 102, so that they do not ever close an electric circuit. In the event that the cassette is not in its playback position, the top end portion 100a of the tape detecting device 100 moves into the cassette playback position as the slide plate 54 slides toward the cassette playback position as illustrated in FIG. 16B, and about at the time $t_{0C2}$ the conductive contact portion 100b finally moves into engagement with the contact 102. Although the slide plate 54 continues to slide, the conductive contact portion 100b of the tape detecting device 100 is prevented from further movement by the contact 102 and remains in contact therewith.

With the detecting device of such an arrangement as above described, the presence of the tape can be electrically detected. The tape detection and control can be carried out by using this electric detecting circuit in place of the engagement of the pinch roller 56 with the capstan 34, the circuit II' or the switching circuit V. In this case, the pinch roller portion $56_2$ need not to be made of a conductive material.

Figure 17A:
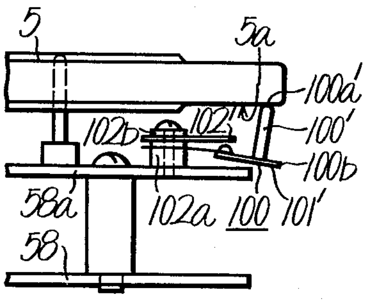
Figure 17B:
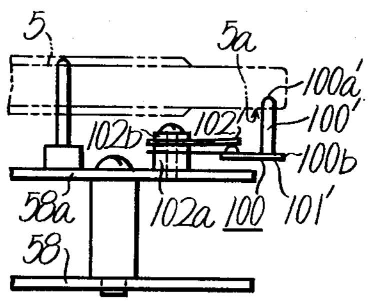

FIGS. 17A and 17B illustrate a further modified form of the tape detecting device. In this example the detecting device 100 consists of a pair of normally closed contact pieces 101' and 102' which are fixedly mounted on the support plate 58a through insulating spacers 102a and 102b. In this case the contact piece, for example, 101' is made of a resilient material and a pin 100' is planted on the free end of the contact piece 101' in such a manner that the top 100a' of the pin 100' may reach the cassette playback position in response to the movement of the slide plate 54. Accordingly, when the cassette lies in its playback position as shown in FIG. 17A, the pin 100' is pushed by the side 5a of the cassette to open the normally closed switch contact pieces 101' and 102'. In the event that no cassette is present as depicted in FIG. 17B, the contact pieces 101' and 102' remain closed. The illustrated example employs the normally closed switches and the operating time of the detecting switch DS shown in FIG. 14 is from the time $t_{0K}$ to $t_{2K}$ and when the cassette is in its playback position the aforesaid normally closed contact remains open for a time longer than the above one, that is, from the time $t_{0C2}$ to $t_{2C1}$. In the absence of the cassette the normally closed contact remains closed and consequently the detecting switch DS operates.

With the automatic tape cassette recording and playback apparatus of this invention described in the foregoing, cassettes except one being played back can be freely exchanged during the playback operation, so that rearrangement of the tape cassettes and replacement with new ones can be carried out at will.

In the foregoing examples the tape cassettes are arranged side by side but it will be seen that the tape cassettes can be similarly played back when arranged radially.

In the foregoing examples the tape cassettes are sequentially played back in the order in which they are arranged in the cassette support frame but it is easy to construct the apparatus such that desired one of a plurality of tape cassettes arranged at random is automatically selected and brought to the guide hole and played back by the method above described.

The advantages of the apparatus of this invention are as follows.

1. Since the player is driven by a single motor, the overall structure of the apparatus can be made small in size and inexpensive.
2. Since many tape cassettes can be directly mounted in the cassette support frame which forms one portion of the player and has the cassette holding pieces, the tape cassettes are easy to handle and, further, as their head contact surfaces are held downward, dust or the like hardly adheres to the tape.
3. The cassette support frame has the cassette holding pieces integrally formed on the inside thereof and the rack of the cassette support frame drive means integrally formed on the outside of the frame and the support frame is driven by meshing the gear with the rack, so that precision for the positioning of the cassettes for playback can be held extremely high.
4. As no drive members of the player are disposed above the tape cassettes arranged in the cassette support frame, the tape cassette being played back can be freely seen from the outside and indication of the content recorded on the tape of each cassette can be easily effected. Further, since no manual operation is required during playback, there is no possibility of injuring the operator's hand.
5. As the smooth peripheral surfaces of the tape cassette support are caused to project out onto the top deck plate through the guide hole, the sliding movement of the tape cassette in the horizontal direction is facilitated.

6. The upward and downward movement of the tape cassette through the guide hole can be achieved slowly because of the use of the pins and cam mechanism. This ensures the cassette transfer operation and makes little noise during the cassette lowering and raising operations.
7. The tape cassette support is always biased by the spring to the top deck plate, so that even if the tape cassette in abnormal condition or a foreign member is brought into the playback position, the force is applied to the spring and the support may move and is not ever broken and that even if the upward movement of the tape cassette from its playback position is hindered by an external force, the tape cassette and the support are not ever broken.
8. The slide plate having mounted thereon the tape drive means is always biased by the spring in a direction of the cassette playback position and the slide plate is driven against the force of the spring, so that when the tape cassette has been placed incorrectly at its playback position or a foreign member has been placed in the cassette playback position, the tape drive means mounted on the slide plate does not apply a force greater than the tensile force of the spring and accordingly the tape cassette or the tape drive means are not broken.
9. Since the tape cassette placed in its playback position is held at its both sides by the holding pieces, the tape cassette is thereby prevented from movement in its lengthwise direction (horizontal direction). This ensures restoration of the tape cassette to its initial position after playback.
10. The provision of the rail-like guides on the top deck plate in the direction of the sliding movement of the cassette support frame facilitates transportation of the cassette in its lateral direction, prevents wear of the top deck plate, adds to the beauty of the deck plate and lengthens the life of the top deck plate.
11. As the rotation of the cam necessary for automatic operation of the apparatus is transmitted through the gear train from the motor shaft by the clutch mechanism having the rollers, instantaneous start and stoppage of the cam shaft can be achieved. Accordingly, the inertial moment on the driven side can be extremely diminished thereby to ensure prompt control and provide for enhanced precision of the stop position.
12. The cam mechanism for driving the cassette support, sliding the tape drive means, driving the support plate having mounted thereon the head and pinch roller and driving the rotary plate of the cassette support frame drive means is mounted on the single main shaft and drive of the rotary switch is similarly achieved by the main shaft, so that interrelation of their automatic operations can be always controlled with high precision and control members can be brought together within a limited space, thereby to facilitate assembling, maintenance and replacement of the control members.
13. The final tape playback position is detected by opening of the single switch due to engagement of the cassette support frame when the frame has reached its extreme position, so that the automatic stopping mechanism can be greatly simplified.
14. As automatic stoppage of the tape cassette during playback is carried out by the single switch connected in series with the final tape playback position detecting switch, the automatic stop means is simple in construction and easy to handle.
15. With the provision of the tape detecting means, when no tape cassette is present in the cassette support frame, the absence of the tape cassette is detected and a next operation is carried out, so that many tape cassettes can be automatically played back one after another only by turning on the start switch.
16. Since detection of completion of the tape playback is achieved by the pinch roller rotating at a constant speed, the time constant for controlling the detection of completion of the tape playback can be diminished irrespective of slackness of the tape winding or its diameter and the time required for the cassette transfer operation can be shortened.
17. The rejecting operation of the tape cassette during playback can be effected by closing the single normally open switch connected in parallel with the playback completion detecting switch, so that the rejecting mechanism can be simplified in construction and handled with ease.
18. As starting of the apparatus, and rejection and automatic stoppage of the tape cassette during playback can be all controlled by means of electric circuits, remote control of the apparatus can be carried out with a mere electric connection. Accordingly, by separating the operating panel from the apparatus or by providing a remote control panel, the relative arrangement of the apparatus and the panel can be freely selected, which greatly facilitates handling of the apparatus.
19. If another terminal (not shown) is connected in parallel with the power source terminal of the motor and, for example, an amplifier or the like is connected to the terminal, the amplifier can be turned on and off concurrently with starting and stopping of the apparatus. Namely, the amplifier or like device can be concurrently controlled by one device.
20. Since the cassette support frame can be moved by hand, a desired cassette can be selectively brought by hand to the playback position for playback.
21. When the cassette support frame has reached its final tape playback position, the tape cassette can be played back and then automatically stopped only by depressing the start button irrespective of the position of the control switch.

It will be apparent that many modifications and variations may be effected without departing from the scope of the novel concepts of this invention.

I claim as my invention:

1. An automatic tape cassette recording and/or playback apparatus comprising:

a first means for supporting a plurality of tape cassettes with their magnetic head contact surfaces facing downwardly in the same direction;

a second means for slidably supporting the first means and having a guide hole for permitting passage therethrough of a selected one of said plurality of tape cassettes;

a third means for intermittently driving the first means to move said selected cassette to a first position aligned with said guide hole;

a fourth means for supporting said selected cassette at the first position and for moving and removing said selected cassette through said guide hole to and from a cassette recording and/or playback position;

a fifth means including a capstan movably supported on said second means, said capstan movable to engage with and disengage said selected cassette when it has been brought to the cassette recording and/or playback position;

a sixth means including a magnetic head and a pinch roller movably supported by said second means, said magnetic head and pinch roller movable to engage with and disengage said cassette when it has been brought to the cassette recording and/or playback position;

a seventh means including a motor for driving said third to sixth means in a predetermined sequence;

an eighth means for detecting running or stopping of the tape in said cassette; and a ninth means for controlling said seventh means in accordance with the output of said eighth means.

2. An automatic tape cassette recording and/or playback apparatus as claimed in claim 1 further comprising a tenth means for detecting the presence of said cassette or said tape to control the seventh means.

3. An automatic tape cassette recording and/or playback apparatus as claimed in claim 1, wherein said seventh means includes a cam means mounted on a shaft, said shaft being intermittently driven by said motor, and a means for selectively transmitting the rotation of said motor to said shaft.

4. An automatic tape cassette recording and/or playback apparatus as claimed in claim 1, wherein said eighth means consists of a conductive columnar member mounted to said pinch roller and extending about its rotary shaft, an insulating member formed on at least one part of one surface of said conductive columnar member and a conductive piece which alternatively contacts said one surface of said conductive columnar member and said insulating member in accordance with rotation of the pinch roller.

5. An automatic tape cassette recording and/or playback apparatus as claimed in claim 2, wherein said tenth means comprises a conductive capstan, a conductive pinch roller, and an electric power source for applying voltage between said conductive capstan and said conductive pinch roller, the tape being driven gripped between said conductive pinch roller and said conductive capstan to detect presence of the tape.

6. An automatic tape cassette recording and/or playback apparatus as claimed in claim 2, wherein said tenth means includes a rod movably supported by said fifth means, a spring for biasing said rod, a contact device, and an electric power source for applying voltage between said rod and said contact device, said rod being moved in response to movement of said fifth means to detect presence of said cassette.

7. An automatic tape cassette recording and/or playback apparatus as claimed in claim 1, wherein said fifth means has a slide plate for supporting said capstan, said slide plate being movably supported on the lower face of said second means in a manner so as to be slidable in a perpendicular direction of the tape cassettes.

8. An automatic tape cassette recording and/or playback apparatus as claimed in claim 7, wherein said slide plate is biased by spring means toward the tape cassette recording and/or playback position.

9. An automatic tape cassette recording and/or playback apparatus as claimed in claim 1, wherein said second means includes at least two guide rails extending in the direction of the sliding movement of said first means for minimizing friction between the tape cassettes and said second means thereby to facilitate sliding movement of the tape cassettes.

10. An automatic tape cassette recording and/or playback apparatus as claimed in claim 1, wherein said third means includes a rack formed on one outer wall of said first means, a gear meshing with said rack, a spring for driving said gear, a ratchet wheel coaxial with said gear and a rotary plate for controlling said ratchet wheel.

11. An automatic tape cassette recording and/or playback apparatus as claimed in claim 1, wherein said fourth means includes arm support means fixed to the lower face of said second means, an arm rotatable with respect to said arm support means, a cassette support member mounted on the ends of said arm lying near the guide hole of said second means while the apparatus is in its inoperative condition, said cassette support member having an upper surface portion engageable with said cassette, and a spring for normally biasing said cassette support member toward said second means to facilitate the sliding movement of the tape cassettes across said guide hole.

12. An automatic tape cassette recording and/or playback apparatus as claimed in claim 11, wherein the upper surface portion of said cassette support member is above said guide hole.

13. An automatic tape cassette recording and/or playback apparatus as claimed in claim 11, wherein said cassette support member consists of rollers.

14. An automatic tape cassette recording and/or playback apparatus as claimed in claim 3, wherein said transmitting means consists of a roller provided in association with the shaft of the cam means and means for bringing said roller into rotary contact with the motor shaft.

15. An automatic tape cassette recording and/or playback apparatus as claimed in claim 14, wherein said roller bringing means consists of an electromagnet, a resilient member driven by said electromagnet and an arm supporting said roller and engageable with said resilient member.

* * * * *